June 21, 1966 M. CHASE 3,257,497

FACE PLATE WITH CORD STORAGE MEANS

Filed Oct. 22, 1964 4 Sheets-Sheet 1

INVENTOR
MARSTON CHASE
BY Milford A. Juten
ATTORNEY

FACE PLATE WITH CORD STORAGE MEANS

Filed Oct. 22, 1964 4 Sheets-Sheet 2

INVENTOR
MARSTON CHASE

BY Milford A. Juten
ATTORNEY

FACE PLATE WITH CORD STORAGE MEANS

Filed Oct. 22, 1964

INVENTOR.
MARSTON CHASE
BY

FACE PLATE WITH CORD STORAGE MEANS

Filed Oct. 22, 1964 4 Sheets-Sheet 4

INVENTOR.
MARSTON CHASE
BY

／United States Patent Office 3,257,497

Patented June 21, 1966

3,257,497

FACE PLATE WITH CORD STORAGE MEANS

Marston Chase, 1330 New Hampshire Ave., #415 Washington, D.C. 20036

Filed Oct. 22, 1964, Ser. No. 405,902

11 Claims. (Cl. 174—66)

The present invention is a continuation-in-part of my prior application Serial No. 185,338, filed April 5, 1962, now abandoned, and relates to safety in the use of electrical equipment, and more particularly to the care of appliance cords connected to electrical outlets provided on wall surfaces and into which outlet plugs of lamps and appliances are connected. More particularly, the invention relates to a wall plate or face plate structure that covers an electrical connection box, hiding the space between the electrical connection box and the wall, and that provides a neat appearance while performing an additional function of providing storage for non-used portions of electrical cords in order to prevent dangerous or damaging contact with electrical wires.

Heretofore it has been customary to provide electrical outlets at suitable locations and to provide wall plates that cover the outlet connection box with the margins of the wall plates extending at an angle to the central portion of the wall plates and into contact with the wall to provide a smooth attractive appearance. However, these known wall plates have no provision for the storage of unused portions of electrical appliance cords and, consequently, electrical cords to appliances and lamps frequently lie on the floor in loops which are frequently struck or stepped on with resulting injury to persons and damage to the cords and the insulation.

An object of the invention is to provide an electrical outlet covering wall plate structure which overcomes the above objections.

Another object of the present invention is to provide a wall plate structure which provides for storage of the excess cord while providing a neat appearance during use.

A further object is to provide a skeleton type frame for support underneath the conventional outlet covering wall plate which can be installed with a minimum of training and which will perform the function of receiving excess cord.

Another object is to provide a substitute for existing wall plates that performs an additional function of storage of electrical cords.

A further object is to provide a cord storage device which can be adjusted for capacity in accordance with need.

Another object is to provide a wall plate and cord storage device of integral one-piece construction that projects a minimum distance from the wall providing protection against contact with electrical conductors and providing adequate storage for excess length of appliance cords.

A further object is to provide a wall plate assembly structure that protects the walls from becoming soiled and also provides a neat appearance in concealing excess appliance cords.

Other and further objects will be apparent as the description proceeds and upon reference to the accompanying drawings wherein.

Figure 6:
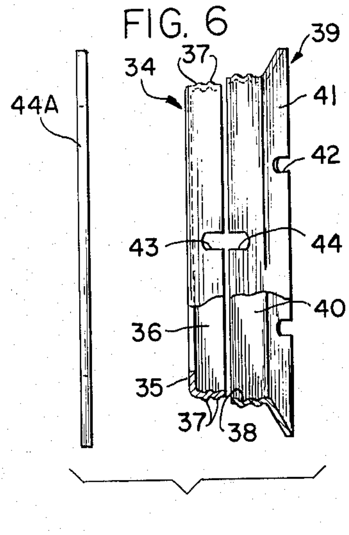

FIG. 6 is an exploded elevation of a further modification in which a cord coil retaining attachment frame structure includes a closed rectangular angle section frame forming an open top box for mounting on the wall receptacle and an outwardly flaring flanged cord coil receiving frame with adjustable connection means for varying the cord coil receiving capacity, and also showing a wall protecting plate for use therewith or for use with other forms of the invention.

Figures 1, 2, 3, 4, 5:
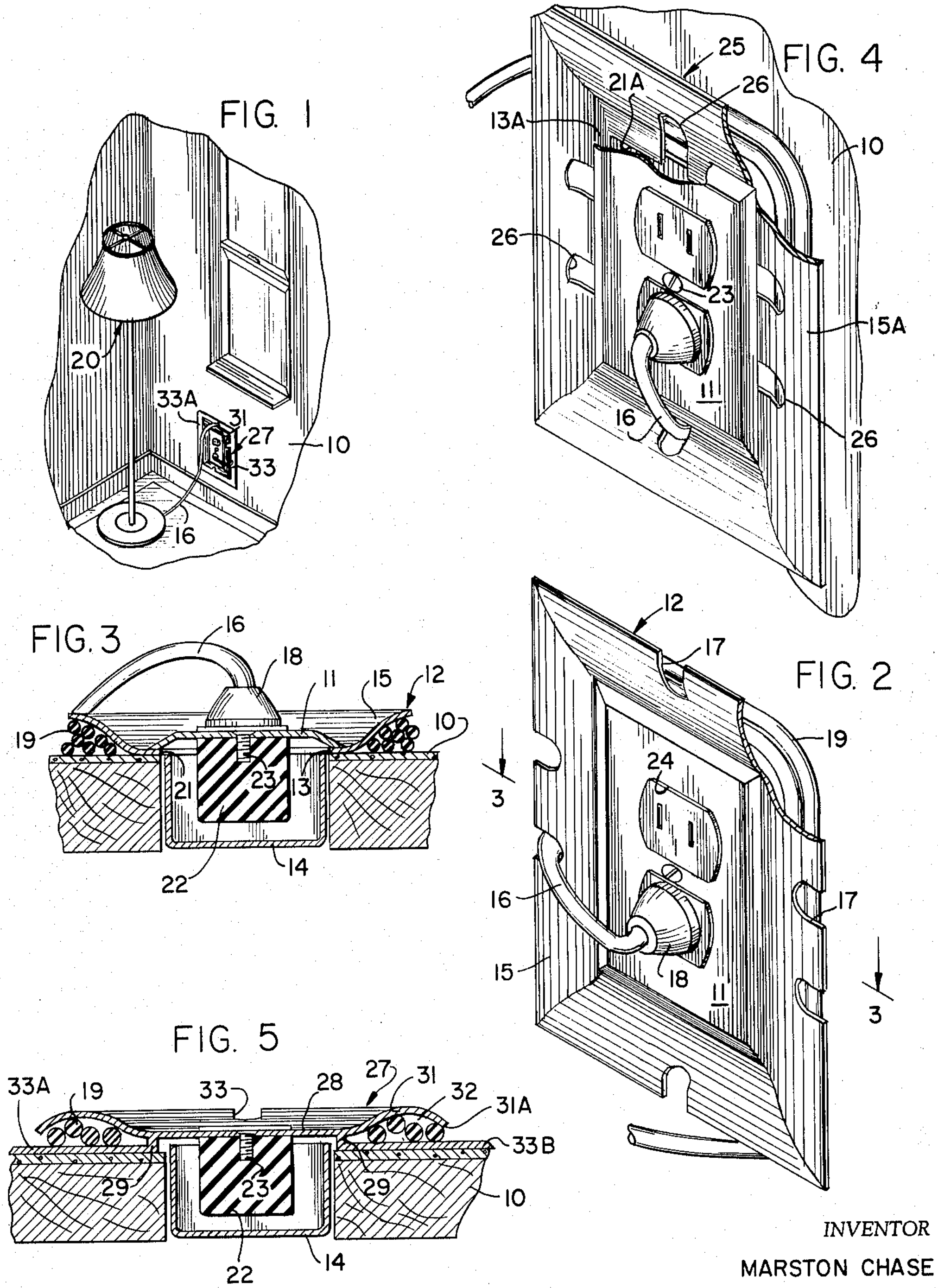
FIG. 1 is a perspective on a reduced scale of a fragment of a corner of a room with the electrical outlet covered by the novel outlet covering wall plate of the present invention mounted on an electrical outlet with a lamp cord connected to the receptacle of the outlet and the excess cord wound in coils between the outwardly flaring periphery of the wall plate and the wall.
FIG. 2 is a perspective with parts broken away of one form of an attachment frame structure for cord storage held in place by the usual outlet covering wall plate engaging the base of the attachment frame holding the excess cord in coils and showing cord receiving notches extending from the outer periphery of the frame.
FIG. 3 is a section taken substantially on line 3—3 of FIG. 2 showing sections of the cord in coiled condition between the cord coil storage frame and the wall.
FIG. 4 is a perspective of a modification showing the cord receiving notches of the attachment cord storage frame extending from the inner periphery of the flaring rim portion of the frame.
FIG. 5 is a section similar to FIG. 3 showing a complete integral outlet covering wall plate of the present invention with a wall protecting plate cooperating therewith, the outlet covering plate having a trough shaped cord receiving rim for additionally confining the cord and hiding the cord from view.
Figure 7:
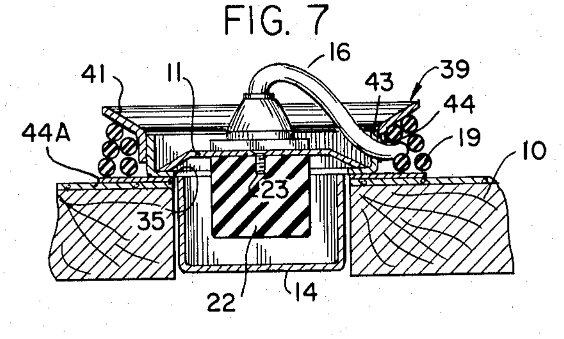

FIG. 7 is a transverse section similar to FIG. 3 showing a structure of FIG. 6 mounted on a wall and adjusted for large capacity and also showing the wall protecting plate in operative position.

Figure 8:
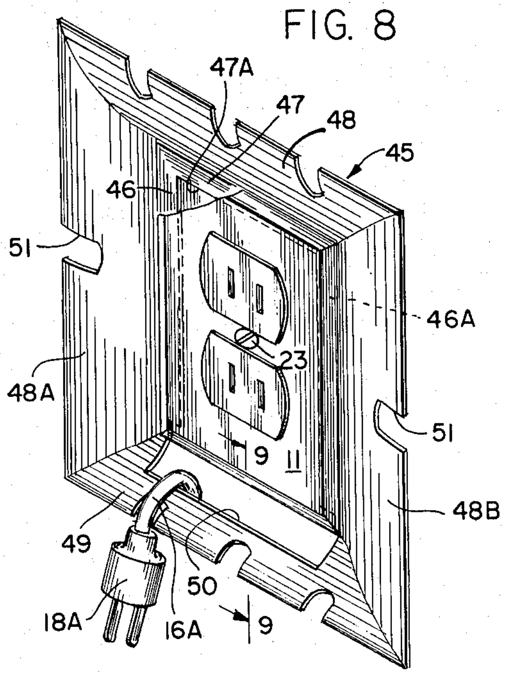

FIG. 8 is a perspective of a further modification of the invention providing for sliding installation without complete removal of the existing outlet covering wall plate.

Figure 9:
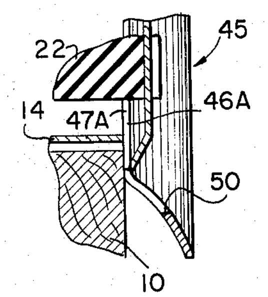

FIG. 9 is a fragmentary section taken substantially on line 9—9 of FIG. 8, showing the slot which permits the installation of the cord retaining frame without complete removal of the usual wall plate and also showing that the slot is of sufficient width to permit a plug to pass therethrough.

Figures 10, 11, 12, 13, 14, 15, 16, 17, 18, 19:
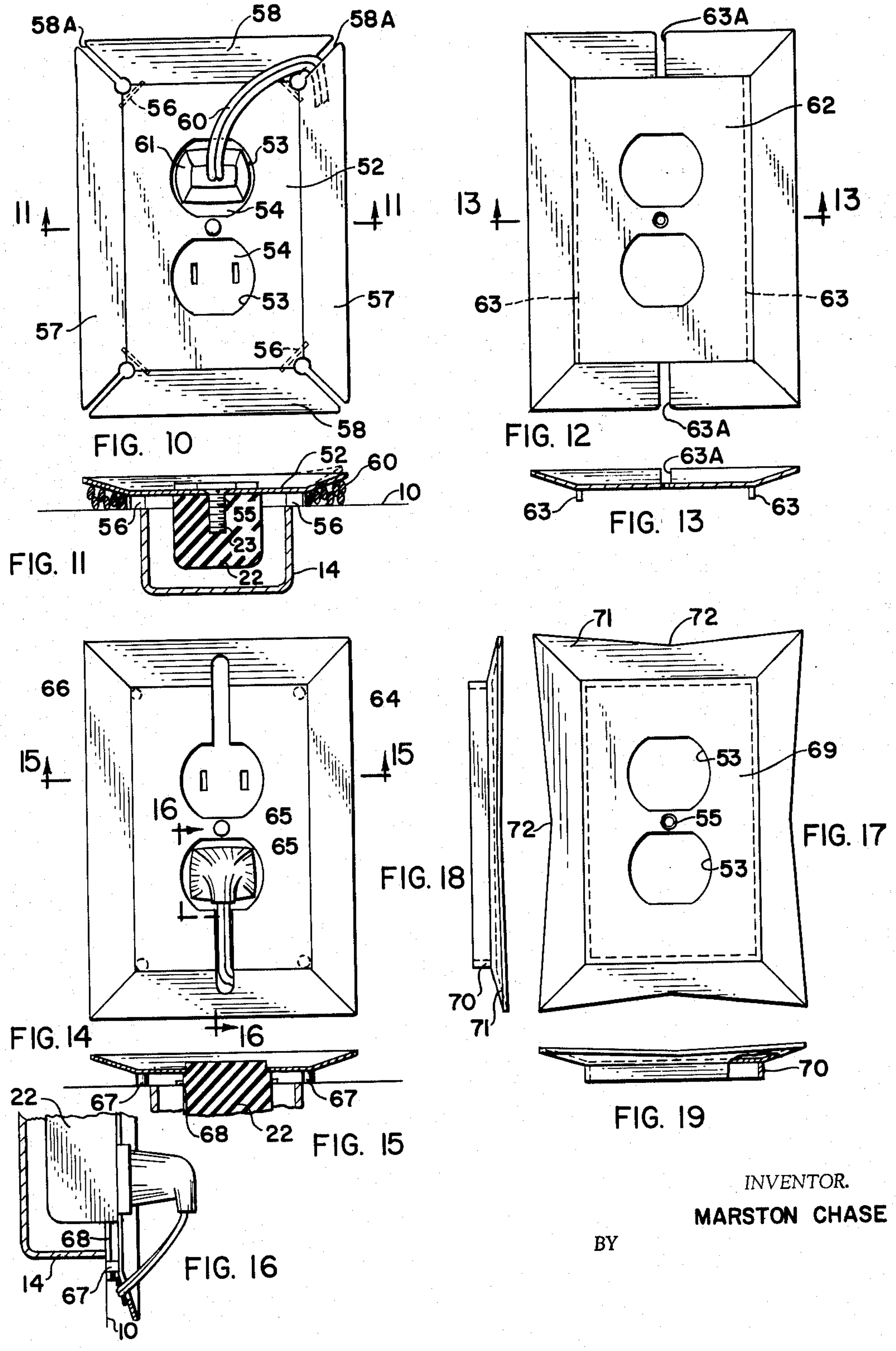

FIG. 10 is a front elevation of a cord storing wall plate of integral construction with narrow slits at each corner adapted to grip the cord.

FIG. 11 is a section taken substantially on line 11—11 of FIG. 10 showing the flexible nature of the wall plate.

FIG. 12 is a front view of a modification having longitudinally extending flanges serving as wall engaging spacer means to provide the cord receiving space.

FIG. 13 is a section taken substantially on line 13—13 of FIG. 12.

FIG. 14 is a front elevation of a modified form of wall plate having strut foot means adjustable as to length to vary the cord storing space and provided with slots extending from the edges of the opening means in the wall plate for receiving the plug receiving portions of the receptacle.

FIG. 15 is a fragmentary section taken substantially on line 15—15 of FIG. 14.

FIG. 16 is a fragmentary section taken substantially on line 16—16 of FIG. 14.

FIGS. 17, 18 and 19 are front, side and end elevations of a further modification in which the foot means is a continuous flange extending inwardly from the periphery and shallow indentations are provided on each edge.

Figure 20:
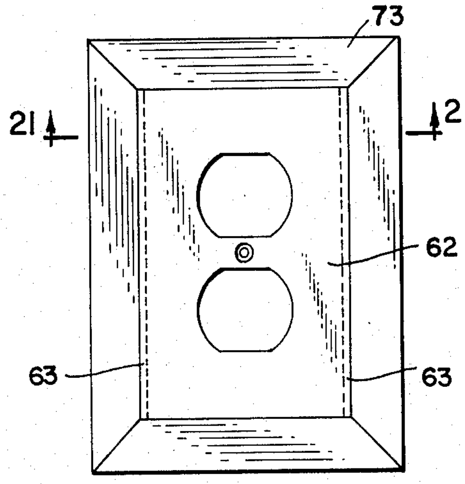
Figure 21:
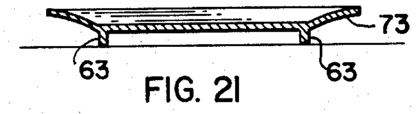

FIG. 20 is a front view of a further modification and FIG. 21 is a section thereof taken substantially on line 21—21 of FIG. 20.

Figures 22, 23, 24:
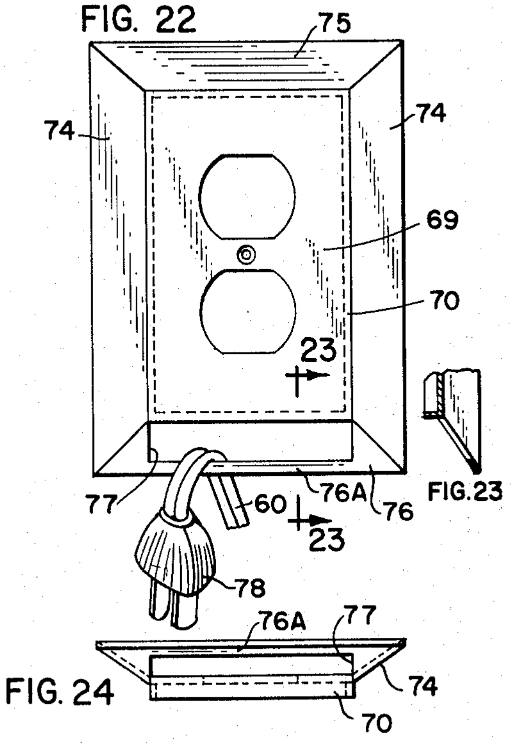

FIG. 22 is a front elevation of a further modification having a continuous flange providing the spacer means and having a cut-out with a closed inner periphery in one marginal portion for receiving the plug end of a cord and for supporting such cord during use or while the cord is disconnected.

FIG. 23 is a fragmentary section taken substantially on line 23—23 of FIG. 22 and FIG. 24 is an end elevation taken from the end having the cut-out in the margin.

Figure 25:
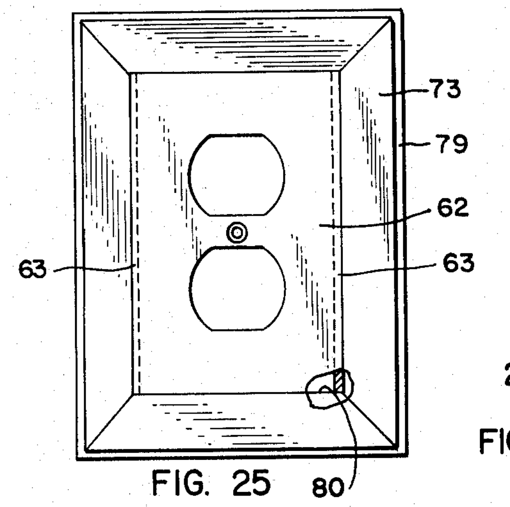
Figure 26:
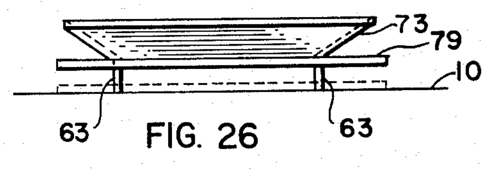

FIG. 25 is a front view of a modified wall plate having a wall protecting plate mounted on the spacer means and FIG. 26 is an end elevation thereof.

Figures 27, 28:
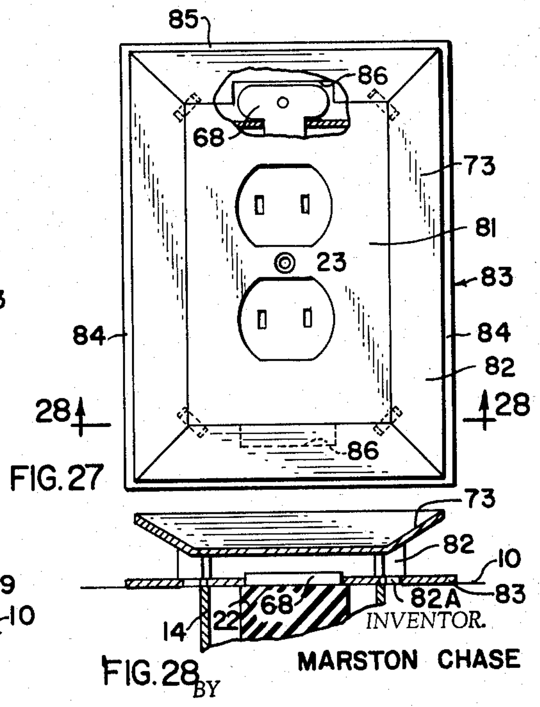

FIG. 27 is a front elevation of a further modification with the wall protecting plate and with spacer means in the form of struts adjacent each corner for engaging the wall protecting plate and/or the wall to maintain the wall protecting plate in position and to provide the cord storage space.

FIG. 28 is an end view with parts broken away showing the offset in the spacer means to maintain the wall protecting plate in operative position.

Briefly, the present invention comprises an electrical outlet covering wall plate of the type covering an electrical outlet connection box and receptacle or an attachement for such outlet covering wall plate to provide a cord storage frame having a base which engages the wall and/or the electrical connection box and has a rim portion projecting outwardly away from the wall and the connection box providing a space between such outwardly projecting rim portion and the wall for receiving coils of electrical cord for storage of such electrical cord. Notches may be provided in the rim portion for receiving the cord for the initial coil and for the portion of the cord extending to the lamp or appliance. To prevent soiling the wall a wall protecting plate is provided so the cord coils are located between the projecting rim and the wall protecting plate.

Referring more particularly to FIGS. 1 and 5, a wall 10 is provided with an electrical outlet having the usual connection box 14 and plug receiving receptacle 22. A wall protecting plate 33A is placed against the wall 10 and is held in place by an electrical outlet covering plate 27. The electrical outlet covering wall plate 27 has a rim portion 31 of outwardly flaring trough shape with notches 33 extending inwardly from the outer pehiphery for receiving a lamp cord 16 from a lamp 20 to start and end coils 19 of such lamp cord.

Upon reference to FIGS. 2 and 3, the usual conventional wall plate 11 retains a cord receiving frame 12. The frame 12 includes a planar base portion 13 abutting the wall 10 outside of the connection box 14 and with the usual electrical outlet covering plate 11 covers the crack or space between such connection box 14 and the wall 10. An outwardly extending peripheral rim portion 15 extends out of the plane of said base portion 13 away from the connection box 14 and away from the wall 10, providing a cord receiving space for receiving the lamp or appliance cord 16. The rim portion 15 is provided with cord receiving notches 17 at convenient locations for receiving the portion of the cord 16 between the plug 18 of the cord and the coils 19, while the same or a different notch 17 may be used to receive the cord 16. It will be apparent that the frame 12 is provided with a central opening 21 within the base 13 for receiving the usual electrical receptacle unit 22 which unit is held in the electrical connection box 14 by the usual attaching screws. The conventional wall plate 11 is held in place by the conventional wall plate attaching screw 23 and the wall plate 11 in turn engages the outer face of the base 13 of frame 12 and retains such frame in the position shown so that the cord 16 may be formed into coils 19 so that any excess lamp cord can be received between wall 10 and rim 15. This space also provides a storage space for extension cords and the like during use or non-use. The wall plate 11 is provided with the usual receptacle or plug receiving opening 24 through which the plug receiving portions of the electrical receptacle unit 22 or the plug 18 of the lamp or extension cord may be received to provide for the electrical connection between the plug 18 and the receptacle unit 22.

Upon reference to FIG. 4, a cord storage frame 25 includes a base portion 13A which engages the wall 10 in a manner similar to that shown in FIGS. 2 and 3 while the peripheral rim portion 15A projects outwardly away from the wall 10 and away from the connection box 14 providing cord receiving space between the wall 10 and the rim portion 15A. Notches 26 are provided in the base 13A and in the inner portion of the flaring rim 15A for receiving the cord 16. In the use of this modification the cord 16 is put in place before the frame 25 is attached by inserting the cord in the opening 21A of the base 13A and into one of the notches 26 and the frame 25 is then secured in position by the usual wall plate 11 and the mounting screw 23.

Upon reference to FIGS. 1 and 5, the outlet covering wall plate 27 of the present invention includes a central section 28 secured to the receptacle unit 22 by a screw 23. An integral base rib section 29 of rectangular shape is provided on the rear surface of the central section 28 and the rib is integral with a wall protecting plate section 33A extending outwardly from the rib 29 outside of the connection box 14 with the wall protecting plate engaging the wall 10. The outlet covering plate 27 includes a trough shaped rim section 31 which flares outwardly from the periphery of the central section 28 and then extends toward the plane of central section 28 terminating in a margin 31A, thereby providing a space 32 between the trough-shaped rim section 31 and the wall protecting plate 33A for receiving coils 19 of the appliance cord 16. The wall protecting plate 33A is shown integral with the outlet covering wall plate 27 but the wall protecting plate and the central section may be a separable section if desired. The spacing between the outer margin 31A and wall protecting plate 33A may be slightly less than the diameter of the cord 16 so that the margin is slightly displaced upon placing or removing the coils 19. The notches may be omitted and the confining action between margin 31A and wall protecting plate 33A performing the same function.

It will be apparent that the other modifications may have the trough shape structure and confining action between the outer margin 31A and the wall. The outer margin 33B of the wall protecting plate 33A is beveled as shown, to assist in guiding the cord into the storage space 32, and the margin 31A of the wall plate has its edge substantially normal to the curvature and assists in guiding the cord into storage position.

In FIGS. 6 and 7 an open top box 34 having an inwardly extending base portion 35 and a peripheral wall portion 36 including end walls and side walls is adapted to be held in position by the usual outlet covering wall plate 11 and the attaching screw 23 in the manner previously described. Upon the end walls detent projections 37 are provided for cooperation with keeper recesses 38 on the end walls of a coil receiving frame 39, which coil receiving frame includes a peripheral wall portion 40 having side and end walls for telescopically receiving the side and end walls 36 of the open top box 34. The frame 39 also includes an outwardly flaring rim 41 providing a flange for retaining coils 19 of the cord 16.

Suitable notches 42 are provided in the side portions of the rim 41 for receiving the cord 16. In addition to or as a substitute for notches 42, notches 43 are provided in the top edges of the side walls of the open top box 34 and notches 44 are provided in the bottom edges of the side walls of the frame 39 for the reception of the cord 16 so that when the frame 39 is applied to the open top box the cord 16 can be retained in the cooperating registering notches 43 and/or 44.

Upon reference to FIGS. 6 and 7 and as shown in FIG. 7, the frame 39 is in a position where the top detent projections 37 shown in FIG. 6 are received in the bottom detent receiving recesses 38 to provide a large size space between the wall 10 and rim 41 for receiving the coils 19. The frame 39 can be adjusted into a position in which the bottom edge of wall portion 40 engages the wall 10 so that both detent projections 37 and both recesses 38 are in engagement, thereby reducing the distance between rim 41 and the wall 10. This structure provides for ready attachment or detachment of the coil receiving frame 39 from the open top box 34 when it may be desired to reduce the projection thereof into the room.

It will be apparent that the open top box 34 may be made to include a center portion in a manner similar to the plate 27 of FIG. 5 to avoid the need for the usual outlet covering wall plate 11.

A wall protecting plate 44A may be provided in direct engagement with the wall 10 so that the coils 19 will be prevented from contacting the wall to avoid marking the wall by the direct contact of the cord and such plate 44A may be held in position by frictional engagement with the wall and the clamping action between the wall and the base or bottom 35 of the open top box 34. It will also be understood that the plate 44A may be made integral with the open top box 34 and may be a direct extension and lie in the same plane with the bottom or base portion 35 thereby reducing the overall projection of the box from the wall.

In FIGS. 8 and 9, a cord coil supporting frame 45 is shown to include a base having side portions 46, 46A and one end 47 defining a central opening 47A. Peripheral outwardly flaring rim sections 48, 48A and 48B are attached to the base portions 47, 46 and 46A respectively. One rim section 49 is provided with a cut-out 50 communicating with central opening 47A, and is connected by its ends to rim sections 48A and 48B. This structure provides for application of the frame 45 to the electrical outlet by loosening the attaching screw 23 for the conventional wall plate 11 a sufficient amount to permit raising the usual wall plate 11 at least the thickness of the base portions 46, 47 and 46A so that the cut-out 50 may receive the conventional outlet covering wall plate 11 and the cord attaching frame can be slid into position from the top as shown in FIG. 8 to the position in which the cut-out is at the bottom. The rim sections are provided with one or more cord receiving notches 51. The cut-out 50 may serve as a cord receiving opening if desired and can be used in a manner similar to the notches shown in FIG. 4. This cut-out is of sufficient width to receive a plug 18A when the plug of the electrical cord is of small thickness so that such plug can be passed through the cut-out 50 after installation of the cord attaching frame. The plug end of the cords 16A may be supported from cord coil supporting frame 45 during periods of non use as shown.

Referring to FIGS. 10 and 11 a modified form of wall plate includes a substantially flat central section 52 having opening means 53, 53 which receive the plug receiving portions 54, 54 of the receptacle 22 and such central section is secured to the receptacle by the machine screw 23 having its flat head received in a countersunk aperture 55 in the central section 52. Wall engaging spacer means in the form of lugs or struts 56 are secured to the central section 52 a being integral therewith and abut the wall 10 to maintain the central section of the wall or face plate in fixed spaced relation to the wall 10. Margin rim portions including sides 57, 57 and ends 58, 58 are integral extensions from the central section 52 and such margins are separated by narrow slits 58A located at each corner with the slits being of sufficient width to accommodate a relatively flat two-wire appliance cord 60 extending from a plug 61 in one of the plug receiving portions 54 of the receptacle 22 and the sides of such slits 58A grip the cord 60 to provide for retaining the cord in position and the cord 60 is wrapped around the lug or strut spacer portions 56 to provide for storage of the excess cord between the margin rim portions 58, 57 and the wall 10. It will be noted that the material of the margin rim portions is flexible to permit slight displacement as shown in FIG. 2 to easily accommodate the cord and still provide proper friction to maintain the cord in the slits 58A.

In FIGS. 12 and 13 a modification is shown including a central section 62 having elongated flanges or ribs 63 at each side to provide the spacer portions for engaging the wall and the margin rim portions flare outwardly away from the flange foot portions 63 to provide a cord storage space between such margin rim portions and the end margin rim portions are provided with a relatively narrow slit 63A to receive a cord and to provide for the start and/or the finish of the coiling of the wires in the space between the margin rim portions and the wall with the flange spacer portion providing for the necessary spacing.

In FIGS. 14, 15 and 16 a modification is shown to include a central plate section 64 having opening means 65, 65 for receiving the plug receiving portions of the receptacle 22 and a continuous margin rim portion 66 flares outwardly from the central plate section 64 and strut spacer portions 67 extend in the opposite direction toward the wall 10 to space the central section 64 and the margin rim portion 66 to provide a cord storage space of the proper volume and the struts 67 may be cut to size to vary the precise spacing between the wall plate and the wall 10 to increase or reduce the effective volume of the cord receiving space. The receptacle 22 is provided with the usual mounting ears 68 which extend beyond the ends of the connection box 14 and engage the wall 10 and suitable shims may be provided between the ears 68 and the wall 10 to assure the proper cooperation between the wall plate, the wall and the receptacle so that the proper relation of the parts can be maintained even though the lengths of the strut legs or spacer means 67 are adjusted within reasonable variations to accomplish the desired result of the correct volume of the space between the margin rim portion 66 and the wall 10.

In the modification of the face plate shown in FIGS. 17 to 19, a central plate section 69 is provided with the receptacle receiving opening means 53 and the countersunk aperture 55 and is maintained in spaced relation to the wall by a continuous flange 70 serving as the spacer means and from the flange 70 the margin rim portion 71 extends continuously around the periphery of the central section 69 flaring outwardly away from the flange foot spacer portions 70 but the margin rim portions are reduced in width at the center of each edge to provide shallow wide notches 72 to assist in guiding the cord from a plug to the cord receiving space.

The modification of FIGS. 20 and 21 includes a central section 62 having flanges 63 on each side edge providing the spacer means and the outwardly flaring margin rim portion 73 is continuous to provide the desired cord storage space.

In the modification of FIGS. 22 to 24, the central plate portion 69 has a continuous flange 70 providing the foot portion and the rim includes outwardly flaring sides 74, 74 and an outwardly flaring end 75 while the other outwardly flaring end 76 is provided with a large cord receiving opening 77 having a closed periphery with the opening 77 being of sufficient size to receive a plug 78 of a cord 60 so that the plug may be passed through the slot 77 even with the wall plate mounted in place since the continuous flange foot portion 70 is of sufficient width along with the degree of flaring of the rim margin portions and the size of the opening 77 to permit this insertion and removal of the plug 78 which is also facilitated by the resiliency of the material of the wall plate since the margin portion 76A of the end margin rim portion 76 can be flexed. It will be apparent that cords not in use may be held in place as shown in FIG. 22 to permit other cords to be inserted into the receptacle.

Referring to FIGS. 25 and 26, a further variation includes a central plate section 62 having flange foot portions 63 at each side thereof and a continuous margin rim portion 73 extending therearound similar to the modification of FIGS. 20 and 21 with the addition of a removable wall separation plate 79 and such wall separation plate has its outer periphery projecting beyond the periphery of the outwardly flaring rim margin portion 73 but the central portion of the wall separation plate 79 is cut away to provide a continuous inner periphery 80 which snugly engages the foot forming flanges 63, 63 whereby friction may retain the wall separation plate 79 in the full line position shown in FIG. 26 to provide a relatively small cord storage space between the margin rim portion 73 and the wall separation plate 79 while also providing for a cord storage space between the wall separation plate 79 and the wall indicated by the line 10 thereby providing for storage of two separate appliance cords without having the cords in intertwined relation thereby permitting easy removal of either cord without disturbing the other cord.

It will also be noted that the wall separation plate 79 can be placed in the dotted line position in contact with the wall 10 to provide a wall protecting plate. It will be apparent that the wall separation plate 79 may be fixedly secured in either the full line position or the dotted line position by any suitable means such as an adhesive, notches provided in the foot means 63 or by being made integral with the foot means 63.

Upon reference to FIGS. 27 and 28, a wall plate including a central section 81 is provided with lug feet 82 at each corner and a continuous outwardly extending peripheral margin rim portion 73 and such lug foot portions serve to retain a wall protecting plate 83 against a wall 10. The wall protecting plate 83 includes sides 84, 84 and ends 85, 85 which are somewhat similar to the sides and ends of the wall separation plate 79 but the end portions are provided with cut-outs 86 to receive the mounting ear 68 of the receptacle 23 so that the wall protecting plate 83 may be in continuous smooth abutment with the wall 10 and the mounting ears 68 of the receptacle will lie substantially in the plane of the wall protecting plate 83. To maintain the wall protecting plate 83 tightly against the wall 10, the lug foot means 82 at each corner is provided with an offset to provide an extension 82A of the foot portion 82 with the extension 82A being of less height than the thickness of the plate 10 but being of a shape to snugly fit into the corner formed by the inner periphery of the adjacent side 84 and end 85 of the wall protecting plate 83 thereby centering the wall protecting plate with respect to the receptacle and wall plate and also retaining the wall protecting wall plate snugly against the wall by the action of the usual mounting screw 23.

It will also be apparent that the wall protecting plate 83 may be used to bridge wider spaces between the connection box 14 and the wall 10 in the event that careless workmanship or accident causes the space to be excessive since the wall protecting plate 83 may bridge the gap and provide for support of the wall plate over an extended area since the wall plate may be made of relatively rigid construction to obtain this advantage.

The wall plate cord storage structure of the present invention is made of a suitable material such as resins, plastics, metals or the like but preferably of non-conducting material. It will thus be seen that applicant has provided a new and useful structure for the storage of strand material and particularly strands of electrical appliance cords and the like.

It will be understood that various changes and modifications are contemplated within the scope of the invention as defined in the valid scope of the claims.

What is claimed is:

1. The combination with an electrical outlet mounted in a wall with the plug receiving portions of said electrical outlet projecting outwardly from the plane of the wall, including a sheet-like body having a central electrical outlet receiving opening means therein with said opening means being defined by an attaching flange in contact with the wall around a substantial portion of the electrical outlet, a face plate having opening means for receiving the plug receiving portions of the electrical outlet and mounted on said electrical outlet and having its outer periphery engaging said attaching flange whereby the mounting of the face plate causes the periphery of said face plate to tightly engage said attaching flange thereby securing the attaching flange and said sheet-like body in fixed relation to said wall, said sheet-like body including a continuous outer peripheral flange diverging away from the attaching flange and away from the face plate providing an appliance cord receiving space between said peripheral flange and said wall, said sheet-like body having a cord-receiving notch formed in the inner periphery thereof through said attaching flange along one edge of the face plate and into the diverging peripheral flange of the sheet-like body, the dimension of said notch along the periphery of the face plate being greater than the dimension of the corresponding edge of the face plate and the dimension of the notch transverse to the corresponding edge of the face plate being sufficient for the passage of the face plate therethrough whereby the sheet-like body may be applied to the electrical outlet by sliding the remaining attaching to flange between the corresponding edges of the face plate and the wall so that the sheet-like body may be applied without complete removal of the wall plate.

2. The combination with an electrical outlet including a receptacle and a connection box mounted in a wall with the plug receiving portions of the electrical outlet projecting outwardly from the wall, a face plate including a central section having opening means receiving the plug receiving portions of the receptacle, margin rim portions projecting outwardly and radially from said central section and outwardly of the periphery of the connection box, spacer means of a height in the order of the width of an electric cord on the surface of said face plate adjacent said wall and located at the junction of said central section and margin rim portion and engaging the wall outside of the connection box of the electrical outlet, means securing said face plate to the receptacle, connection box, and wall maintaining said face plate in fixed relation with respect to said outlet and maintaining said spacer means closely adjacent said wall providing a cord storage space outwardly of said spacer means and between said margin rim portions and said wall.

3. The invention according to claim 2 in which the central section is rectangular and the spacer means includes a strut adjacent each corner of the face plate.

4. The invention according to claim 2 in which the spacer means includes ribs extending along opposed portions of the connection box.

5. The invention according to claim 2 in which the wall plate and the margin rim portions are an integral one-piece unit and one margin portion along an edge has a cut-out having a closed periphery on the edge of the cut-out adjacent an edge between the spacer means and the outer periphery of the outwardly projecting margin rim portion of a size to permit the passage of a plug of an electric cord therethrough.

6. The invention according to claim 5 in which a wall protecting plate is positioned between the margin rim portions and the wall and is mounted on said spacer means to maintain the wound cord out of contact with the wall.

7. An integral one-piece face plate and excess cord storage device comprising a generally flat planar central section having receptacle receiving opening means therein so the exposed plug receiving portion of a receptacle may be exposed from one surface of the face plate, margin portions connected to and extending outwardly from and flaring away in one direction from the central section and away from said one surface, spacer means projecting from the other surface of said face plate adjacent the connection of said margin portions to said central section to engage a wall on which a receptacle and the face plate are mounted providing a cord storage space between the other surface of said margin portions and the portion of the wall adjacent the receptacle against which portion of the wall the spacer means of the face plate is adapted to abut.

8. An integral one-piece face plate and excess cord storage device comprising a central section having receptacle receiving opening means therein so the exposed plug receiving portion of a receptacle may be exposed from one surface of the face plate, margin portions connected to and extending outwardly from the central section, spacer means projecting from the other surface of said face plate adjacent the connection of said margin portions to said central section to engage a wall on which a receptacle and the face plate are mounted providing a cord storage space between the other surface of said margin portions and the portion of the wall adjacent the receptacle against which portion of the wall the spacer means of the face plate is adapted to abut, a cord receiving closed periphery cutout extending from the receptacle receiving opening means to adjacent the connection between the central section and the margin portions and outwardly of the foot means whereby a cord may pass through the closed periphery cutout and extend around the central section of the wall plate engaging the foot means thereof for storage without having the portion of the cord adjacent the plug pass over the outer periphery of the margin portion, a cord receiving closed periphery cut-out extending from the receptacle receiving opening means to adjacent the connection between the central section and the margin portions and outwardly of the spacer means whereby a cord may pass through the closed periphery cut-out and extend around the central section of the face plate engaging the spacer means thereof for storage without having the portion of the cord adjacent the plug pass over the outer periphery of the margin portion.

9. A face plate for application to a receptacle mounted in a connection box for storing an appliance cord comprising a central section having a receptacle receiving opening means, at least one countersunk opening on one surface thereof for receiving the head of a face plate securing means, and spacer structure on the opposite surface of said face plate inwardly from the outer peripheral edge of the face plate with the spacer structure being spaced from the receptacle receiving opening means a sufficient distance to engage a portion of a wall outwardly of the periphery of the connection box on which the face plate is to be mounted, said spacer structure being spaced inwardly from the outer periphery of the wall plate providing a cord storage space between the spacer structure, the outer periphery of the face plate, and the wall, the surface of the outer periphery of the face plate adapted to face the wall being located outwardly and radially of the spacer means and spaced from the wall engaging portions of the spacer means a distance greater than the thickness of an appliance cord.

10. The invention according to claim 1 in which the dimension of the notch transverse to the corresponding edge of the face plate is sufficient to permit a plug of the appliance cord to pass therethrough.

11. The invention according to claim 2 in which the face plate is generally rectangular and the outer periphery of said margin rim portion converges from each corner towards the central section providing a narrow rim increment on at least one edge whereby an appliance cord stored between said margin rim portion and said wall may be exposed to view a minimum amount while winding of the cord for storage is facilitated by the greater spacing of the corners of the face plate from the wall.

References Cited by the Examiner

UNITED STATES PATENTS

| | | | |
|---|---|---|---|
| 1,696,495 | 12/1928 | Malling | 191—12 |
| 1,901,232 | 3/1933 | Glowacki | 174—66 X |
| 2,097,393 | 10/1937 | Fullman | 50—127 |
| 2,145,447 | 1/1939 | Klingdon | 174—66 |
| 2,231,001 | 2/1941 | Engstrom | 174—66 |
| 2,438,143 | 4/1948 | Brown | 191—12 |
| 3,013,105 | 12/1951 | Craig | 174—135 X |
| 3,042,739 | 6/1962 | Craig | 174—66 |
| 3,173,986 | 3/1965 | Armbruster | 174—52 |

ROBERT K. SCHAEFER, *Primary Examiner.*

JOHN F. BURNS, *Examiner.*

WILLIAM B. FREDRICKS, *Assistant Examiner.*